United States Patent
Barnes

(10) Patent No.: US 7,510,655 B2
(45) Date of Patent: Mar. 31, 2009

(54) PROCESS TO IMPROVE THE EFFICIENCY OF A MEMBRANE FILTER ACTIVATED SLUDGE SYSTEM

(75) Inventor: Dennis J. Barnes, Oconomowoc, WI (US)

(73) Assignee: Siemens Water Technologies Corp., Warrendale, PA (US)

(*) Notice: Subject to any disclaimer, the term of this patent is extended or adjusted under 35 U.S.C. 154(b) by 0 days.

(21) Appl. No.: 11/777,587

(22) Filed: Jul. 13, 2007

(65) Prior Publication Data

US 2008/0041783 A1    Feb. 21, 2008

Related U.S. Application Data

(63) Continuation-in-part of application No. 11/279,354, filed on Apr. 11, 2006.

(51) Int. Cl.
*C02F 3/30* (2006.01)
(52) U.S. Cl. .......... 210/605; 210/610; 210/622; 210/623; 210/903; 210/906; 210/908
(58) Field of Classification Search .......... 210/605, 210/610, 614, 621–623, 630, 903, 906, 908
See application file for complete search history.

(56) References Cited

U.S. PATENT DOCUMENTS

| | | | |
|---|---|---|---|
| 6,517,723 B1 * | 2/2003 | Daigger et al. | 210/605 |
| 6,712,970 B1 * | 3/2004 | Trivedi | 210/605 |
| 7,147,777 B1 * | 12/2006 | Porteous | 210/605 |
| 7,147,778 B1 * | 12/2006 | DiMassimo et al. | 210/605 |
| 7,172,699 B1 * | 2/2007 | Trivedi et al. | 210/605 |
| 7,329,344 B2 * | 2/2008 | Jordan et al. | 210/195.1 |
| 2002/0185435 A1 * | 12/2002 | Husain et al. | 210/605 |
| 2005/0045557 A1 * | 3/2005 | Daigger et al. | 210/605 |
| 2005/0194310 A1 * | 9/2005 | Yamamoto et al. | 210/605 |
| 2006/0249449 A1 * | 11/2006 | Nakhla et al. | 210/605 |

FOREIGN PATENT DOCUMENTS

JP    10-180048    *    7/1998

* cited by examiner

*Primary Examiner*—Fred Prince

(57) ABSTRACT

A process for treating BOD, nitrogen and phosphorus containing wastewater, wherein the process includes the steps of providing wastewater influent into an anoxic zone having activated sludge and mixing the wastewater influent with the activated sludge in the anoxic zone to form a mixed liquor. The process further includes providing the mixed liquor into one more further treatment zones and transferring a portion of the mixed liquor from the further treatment zone to a membrane filter wherein a filtrate is separated from sludge. The process also includes selectively recycling at least a portion of the sludge to the anoxic zone as recycled activated sludge.

23 Claims, 13 Drawing Sheets

FIG. 5a
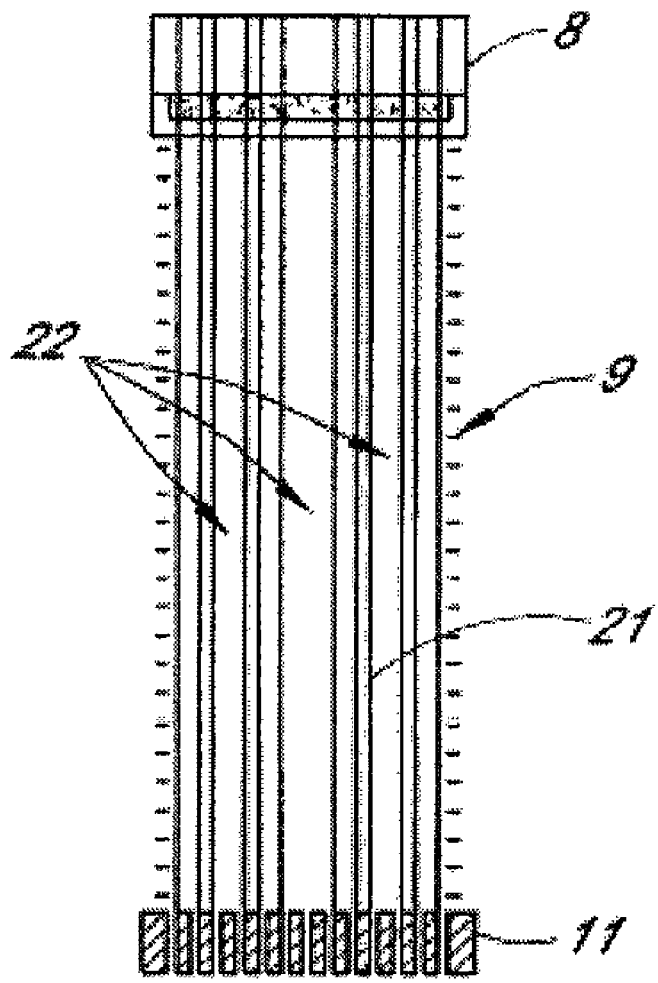
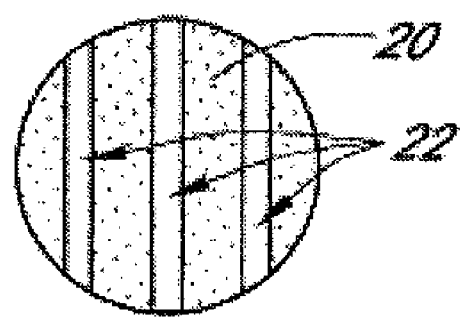
FIG. 5b

FIG. 6a
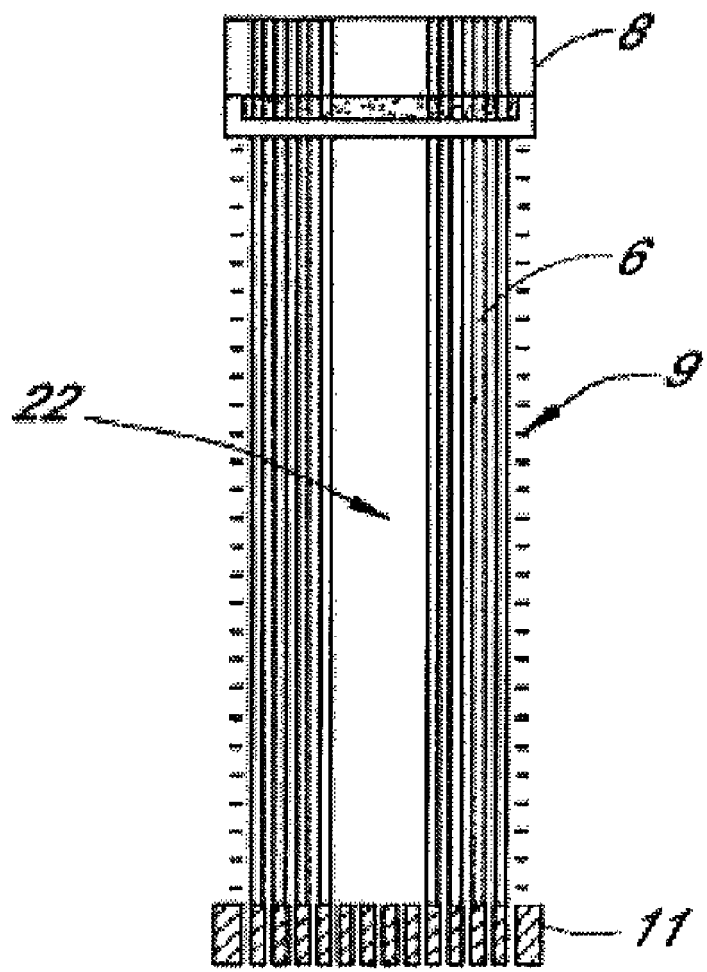
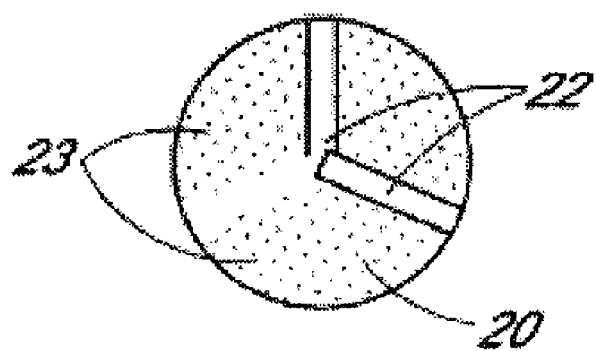
FIG. 6b

PROCESS TO IMPROVE THE EFFICIENCY OF A MEMBRANE FILTER ACTIVATED SLUDGE SYSTEM

This application is a continuation-in-part of U.S. patent application Ser. No. 11/279,354 entitled PROCESS TO IMPROVE THE EFFICIENCY OF A MEMBRANE FILTER ACTIVATED SLUDGE SYSTEM, filed on Apr. 11, 2006, which is hereby incorporated by reference in its entirety.

FIELD OF THE INVENTION

This invention relates to treatment of wastewaters containing BOD, phosphorus and nitrogen, such as municipal sewage, industrial wastewaters and the like by an activated sludge process. More particularly, the invention relates to a process whereby a wastewater influent is mixed with a denitrified-mixed liquor under anaerobic conditions before being mixed with recycled activated sludge in subsequent aeration zones.

BACKGROUND OF THE INVENTION

Activated sludge processes have been used to remove biological oxygen demand (BOD) from municipal sewage, industrial wastewaters and the like. In such a process, a wastewater influent is mixed with a microorganism-containing recycled biomass or activated sludge in an initial contact zone to form a mixed liquor. At some point in the process, the mixed liquor is aerated with sufficient oxygen to grow and maintain a satisfactory population of microorganisms which sorb, assimilate and metabolize the BOD of the wastewater.

In the activated sludge process disclosed in U.S. Pat. No. 3,964,998, wastewater and recycled activated sludge are mixed with mechanical stirrers in a first stage which is operated under anoxic conditions. The mixed liquor is subsequently aerated in a second stage, subjected to anoxic conditions in a third stage, aerated in a fourth stage and then clarified to separate an activated sludge.

In another process, wastewater and recycled activated sludge are mixed and circulated around a plurality of concentric, annular basins or channels by a plurality of surface aeration discs or other mechanical surface aeration devices which churn oxygen into the upper surface of the mixed liquor and provide sufficient agitation to prevent settling. The mixed liquor flows from one channel to the next and finally is introduced into a clarifier to separate an activated sludge. The channels can be operated as a series of complete mix reactors so that the dissolved oxygen content in the first channel in which the wastewater and recycled activated sludge is initially mixed is about zero or less and the dissolved oxygen content is subsequently increased as the mixed liquor moves from one channel to the next.

SUMMARY OF THE INVENTION

The invention provides a process for treating BOD, nitrogen and phosphorus containing wastewater. The process comprises introducing wastewater influent into an anoxic zone having activated sludge and mixing the wastewater influent with the activated sludge in the anoxic zone to form a mixed liquor. The mixed liquor is flowed from the anoxic zone into one or more further treatments zones and from the treatment zone to a membrane filter wherein a filtrate is separated from sludge and recycling at least a portion of the separated sludge selectively to the anoxic zone and/or the further treatment zone as recycled activated sludge.

Preferably, the process may use multiple reactors in series, with the ability to maintain different food to micro-organism ratios and different dissolved oxygen concentrations in each reactor. For preference the anoxic zone may include a mixing device to assist with formation of the mixed liquor. Preferably, the anoxic zone promotes simultaneous nitrification and denitrification. For preference, the method includes recycling a portion of mixed liquor from the further treatment zone to the aerobic zone for mixing therein with the wastewater and the recycled activated sludge.

In another aspect, the process comprises introducing wastewater influent into an anaerobic zone having activated sludge and mixing the wastewater influent with the activated sludge in the anaerobic zone to form a mixed liquor. The mixed liquor is introduced into an oxygen-deficit aeration zone, and denitrified mixed liquor from the oxygen-deficit aeration zone is recycled to the anaerobic zone for mixing therein with wastewater. The process further comprises transferring the mixed liquor from the oxygen-deficit aeration zone to an oxygen-surplus aeration zone, transferring a portion of the mixed liquor from the oxygen-surplus aeration zone to a membrane filter wherein a filtrate is separated from sludge and recycling at least a portion of the separated sludge to the oxygen-deficit aeration zone as recycled activated sludge. A second anoxic reactor, with or without addition of a carbon source to enhance denitrification, may be inserted between the oxygen-surplus aeration zone and the membrane filter for removal of nitrates from the wastewater.

In another aspect of the invention, a process for treating BOD-containing wastewater comprises providing wastewater influent into an anaerobic zone having activated sludge and mixing the wastewater influent with the activated sludge in the anaerobic zone to form a mixed liquor. The mixed liquor is provided into a first aeration zone maintained under conditions which produce a complete mix reaction and provide insufficient oxygen to meet, the biological oxygen demand of the resulting mixed liquor. Denitrified-mixed liquor from the first aeration zone is recycled to the anaerobic zone for mixing therein with wastewater. The process further comprises transferring the mixed liquor from the first aeration zone to a subsequent aeration zone maintained under conditions which produce a complete mix reaction and provide sufficient oxygen to produce an overall dissolved content of at least 0.5 mg/L, transferring the mixed liquor from the subsequent aeration zone to a membrane filter wherein a filtrate is separated from sludge and recycling at least a portion of the separated sludge to the first aeration zone as recycled activated sludge. A second anoxic reactor, with or without addition of a carbon source to enhance denitrification, may be inserted between the subsequent aeration zone and the membrane filter for removal of nitrates from the wastewater."

Preferably, the activated sludge recycled to the oxygen deficit aeration zone contains dissolved oxygen which may be used to assist in the aeration process. The dissolved oxygen in recycled flow is preferably in a concentration of less than 8 mg/l and more preferably in the range of about 4 mg/l to 8 mg/l.

The membrane filter may include one or more membrane modules each comprising a plurality of porous membranes, said membranes being arranged in close proximity to one another and mounted to prevent excessive movement therebetween, and means for providing, from within the module, by means other than gas passing through the pores of said membranes, gas bubbles entrained in a liquid flow such that, in use, said liquid and bubbles entrained therein move past the surfaces of said membranes to dislodge fouling materials therefrom, said gas bubbles being entrained in said liquid by flowing said liquid past a source of gas to draw the gas into said liquid flow.

The membrane modules may also comprise a plurality of porous hollow fibre membranes, said fibre membranes being arranged in close proximity to one another and mounted to prevent excessive movement therebetween, the fibre membranes being fixed at each end in a header, one header having one or more of holes formed therein through which gas/liquid flow is introduced, and partition means extending at least part way between said headers to partition said membrane fibres into groups.

Preferably, the partition means are formed by a spacing between respective fibre groups. The partitions may be parallel to each other or, in the case of cylindrical arrays of fibre membranes, the partitions may extend radially from the centre of the array or be positioned concentrically within the cylindrical array. In an alternative form, the fibre bundle may be provided with a central longitudinal passage extending the length of the bundle between the headers.

The membrane module may comprise a plurality of porous hollow membrane fibres extending longitudinally between and mounted at each end to a respective potting head, said membrane fibres being arranged in close proximity to one another and mounted to prevent excessive movement therebetween, said fibres being partitioned into a number of bundles at least at or adjacent to their respective potting head so as to form a space therebetween, one of said potting heads having an array of aeration openings formed therein for providing gas bubbles within said module such that, in use, said bubbles move past the surfaces of said membrane fibres to dislodge fouling materials therefrom.

The fibre bundle is protected and fibre movement is limited by a module support screen which has both vertical and horizontal elements appropriately spaced to provide unrestricted fluid and gas flow through the fibres and to restrict the amplitude of fibre motion reducing energy concentration at the potted ends of the fibres.

Preferably, said aeration openings are positioned to coincide with the spaces formed between said partitioned bundles. For preference, said openings comprise a slot, slots or a row of holes. Preferably, the fibre bundles are located in the potting head between the slots or rows of holes.

For further preference, the gas bubbles are entrained or mixed with a liquid flow before being fed through said holes or slots, though it will be appreciated that gas only may be used in some configurations. The liquid used may be the feed to the membrane module. The fibres and/or fibre bundles may cross over one another between the potting heads though it is desirable that they do not.

Preferably, the fibres within the module have a packing density (as defined above) of between about 5 to about 70% and, more preferably, between about 8 to about 55%.

For preference, said holes have a diameter in the range of about 1 to 40 mm and more preferably in the range of about 1.5 to about 25 mm. In the case of a slot or row of holes, the open area is chosen to be equivalent to that of the above holes.

Typically, the fibre inner diameter ranges from about 0.1 mm to about 5 mm and is preferably in the range of about 0.25 mm to about 2 mm. The fibres wall thickness is dependent on materials used and strength required versus filtration efficiency. Typically wall thickness is between 0.05 to 2 mm and more often between 0.1 mm to 1 mm.

The membrane filter may also be in the form of a membrane bioreactor including a tank having means for the introduction of feed thereto, means for forming activated sludge within said tank, a membrane module according to the first aspect positioned within said tank so as to be immersed in said sludge and said membrane module provided with means for withdrawing filtrate from at least one end of said fibre membranes.

BRIEF DESCRIPTION OF DRAWINGS

FIG. 5a shows a schematic side elevation of a partitioned membrane module of a membrane bioreactor employed in the filtration apparatus of a preferred embodiment.

FIG. 5b shows a section through the membrane bundle of FIG. 5a.

FIG. 6a shows a schematic side elevation of a partitioned membrane module of a membrane bioreactor employed in the filtration apparatus of a preferred embodiment.

FIG. 6b shows a section through the membrane bundle of FIG. 6a.

FIG. 7b shows a section through the membrane bundle of FIG. 7a.

FIG. 8b shows a section through the membrane bundle of FIG. 8a.

DETAILED DESCRIPTION OF THE INVENTION

Figure 1:
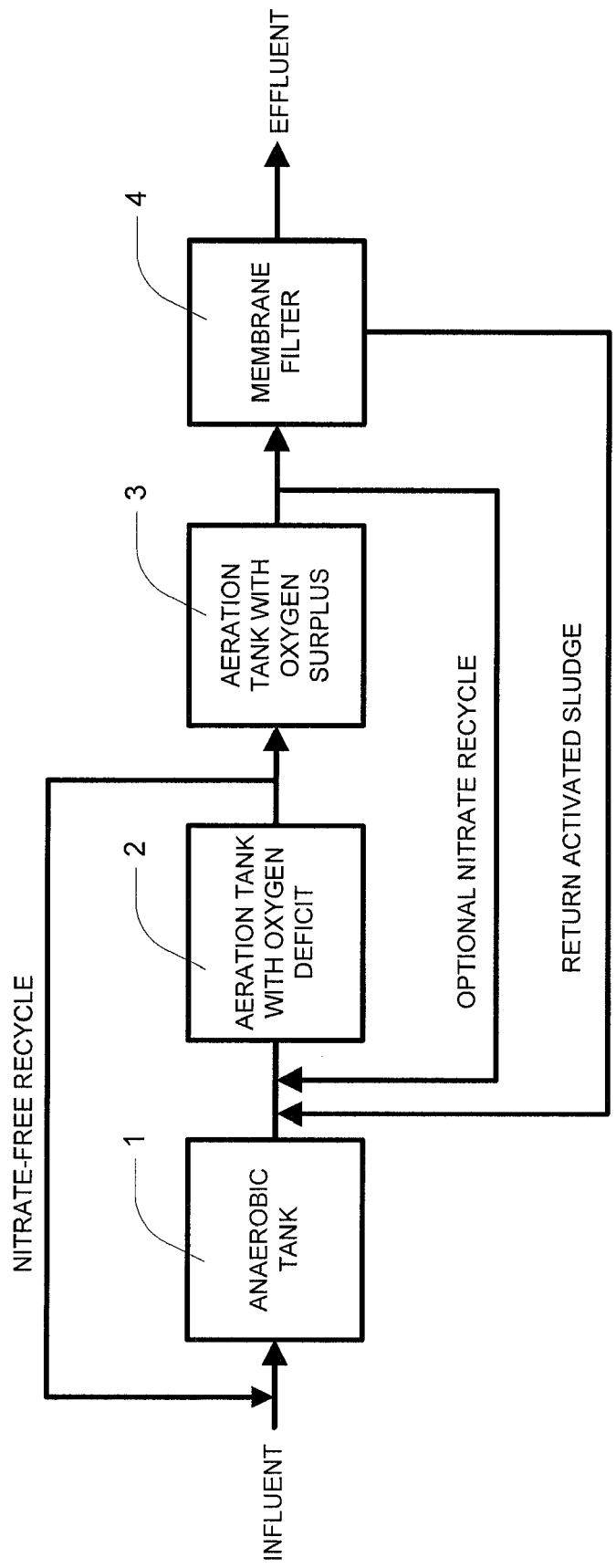
FIG. 1 illustrates a schematic view of an improved wastewater treatment system embodying the invention.

Referring to FIG. 1, this embodiment of the invention employs a complete mix system for treating BOD, nitrogen and phosphorus containing wastewater. In the system, wastewater may or may not be pre-treated to remove grit, large particulate matter and other suspended solids. The wastewater is then fed through a conduit into an anaerobic reactor or reactors 1, which preferably utilize a mechanical mixer (not shown) to keep solids in suspension without aeration.

As shown in FIG. 1, denitrified mixed liquor from a downstream aeration zone 2 having a continuous oxygen deficit is added to the anaerobic zone 1.

Typically, the denitrified mixed liquor is added at a rate from 0.5 to 2 times the wastewater influent flow rate. In the anaerobic reactor zone 1, micro-organisms capable of accumulating quantities of phosphorus in excess of that required for simple cell growth and reproduction take-up and store simple carbon compounds, using energy derived from the hydrolysis and release of polyphosphates. The hydraulic residence time in the anaerobic zone 1 is typically, but not limited to, 0.5 to 2.0 hours.

The combined wastewater and denitrified mixed liquor then flow to one or more downstream aeration zones or tanks 2 having a continuous oxygen deficit. As used herein, the terms "aeration zone or tank having a continuous oxygen deficit" and "oxygen-deficit aeration zone or tank" are synonymous and meant to refer to a zone having a continuous oxygen deficit maintained, e.g., by controlling the rate of aeration such that the rate of oxygen supply is less than the rate of oxygen consumption by the micro-organisms in the tank. This results in dissolved oxygen concentrations at or near zero throughout the basin.

Aerator devices, or a combination of aerator devices and mechanical mixers provide oxygen and keep the mixed liquor solids in suspension, however, in the present embodiment, which employs a membrane filter 4 with aeration, at least some of the oxygen is provided in the activated sludge fed into the aeration zone 2 having a continuous oxygen deficit from the membrane filter 4. Nitrified mixed liquor from a downstream aeration zone 3 having an oxygen surplus may also be added thereto.

Using oxygen supplied by the aerators and recycled activated sludge, heterotrophic organisms oxidize BOD and autotrophic organisms oxidize ammonia in the aeration tank 2 having a continuous oxygen deficit. As the amount of oxygen supplied is less than the demand and nitrates from oxidation of ammonia are present, heterotrophic organisms will oxidize BOD using nitrates as an electron acceptor and converting nitrates into nitrogen gas. The hydraulic residence time in the aeration zone 2 having a continuous oxygen deficit is typically, but not limited to, 2 to 12 hours.

The effluent from the aeration zone 2 having a continuous oxygen deficit then flows to one or more downstream tanks 3 having a continuous oxygen surplus. Most of the BOD and ammonia in the wastewater has been oxidized by the time the wastewater reaches the last aeration zone, so dissolved oxygen concentrations of 1 mg/L or greater are easily maintained in the last aeration zone. Preferably, the dissolved oxygen concentration is at least 5 mg/L. Oxidation of BOD and ammonia occurs in the aeration tanks 3 having a continuous oxygen surplus. In the aeration zone 3 of continuous oxygen surplus, micro-organisms oxidize the carbon that they have absorbed in the anaerobic zone and absorb and store polyphosphates as an energy source for the return trip back to the anaerobic zone 1 as return activated sludge. The hydraulic residence time in the aeration zone 3 having a continuous oxygen surplus is typically, but not limited to, 2 to 12 hours.

Finally, effluent from the aeration tanks 3 having a continuous oxygen surplus flows to the membrane filter 4 where the biological solids are separated. A portion of the effluent may be returned to the biological process leaving a filtrate with reduced levels of organic matter, phosphorus and nitrogen. This filtrate is removed and becomes the process effluent. Some of the separated solids are removed from the system (waste activated sludge), thereby removing phosphorus and organic matter.

Figure 2:
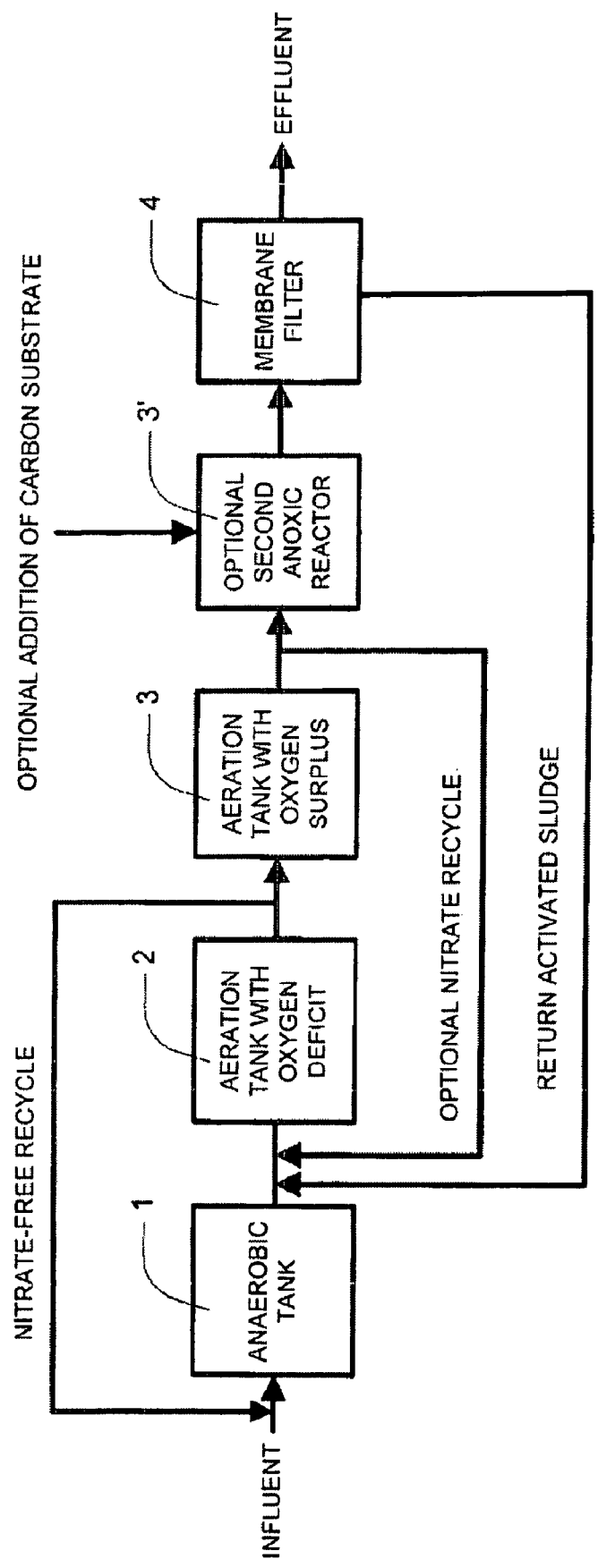
FIG. 2 illustrates a schematic view of an improved wastewater treatment system of another embodiment of the invention.

Referring to FIG. 2, a further embodiment of the invention is shown where a second anoxic reactor zone or tank 3' is provided between aeration tank 3 and the membrane filter 4. This further anoxic reactor zone 3' is used to remove nitrates from the wastewater stream and may optionally be provided with a carbon source to assist nitrate removal.

The Membrane Bioreactor

One of the components of the water treatment systems of preferred embodiments is a membrane bioreactor. Membrane bioreactor systems combine biological treatment, involving bacteria, with membrane separation to treat wastewater. Treated water is separated from the purifying bacteria, referred to as activated sludge, by a process of membrane filtration. Membrane bioreactors typically employ submerged hollow fiber membrane modules incorporated in a distributed flow reactor.

Membrane processes can be used as an effective tertiary treatment of sewage and provide quality effluent. Submerged membrane processes where the membrane modules are immersed in a large feed tank and filtrate is collected through suction applied to the filtrate side of the membrane, and wherein the membrane bioreactor combines biological and physical processes in one stage, are compact, efficient, economic, and versatile.

Membrane bioreactors that can be employed in the water treatment systems of preferred embodiments include those commercially available from USFilter Memcor Research Pty. Ltd. and Zenon Environmental, Inc. These include systems such as USFilter's MEMCOR® MBR Membrane Bioreactor System and Zenon's ZeeWeed® MBR Membrane Bioreactor process utilizing the ZeeWeed® 500 and ZeeWeed® 1000 systems.

The membrane modules employed in the ZeeWeed® 500 system consist of hundreds of membrane fibers oriented vertically between two headers. The membrane is a reinforced fiber with a nominal pore size of 0.04 µm. The hollow fibers are slightly longer than the distance between the top and bottom headers and this allows them to move when aerated. It is the air that bubbles up between the fibers that scours the fibers and continuously removes solids from the surface of the membrane. From 1 to 36 membrane modules are arranged in a cassette. ZeeWeed® 500 system typically consists of two or more parallel trains. Each train consists of a process pump, automatic valves, and instrumentation. The following components are generally required in a system and can either be dedicated to a specific train or shared amongst trains: a tank (into which cassettes are immersed); metering pumps (for chemical addition); membrane blowers (to provide air for scouring the membranes); reject or sludge pump; vacuum pump (for entrained air removal); "clean-in-place" pumps; backpulse or wash tank; and control system. Other components can be employed, depending on the design or application: strainers (for pre-screening the feedwater); process blowers (biological treatment systems only); feed pumps; mixers; sludge recirculation pumps; and cassette removal hoist or other mechanism.

The ZeeWeed® 1000 ultrafilter membrane has a nominal pore size of 0.02 µm and is designed to remove suspended solids, protozoa, bacteria, and viruses from water supplies. The ZeeWeed® 1000 system operates in a mode similar to conventional media filters with direct (dead-end) filtration followed by a periodic air and water backwash. A ZeeWeed® 1000 cassette is made by stacking elements both vertically and horizontally in a block. There are a variety of cassette configurations available ranging in size from 3 to 96 elements. A ZeeWeed® 1000 system consists of a series of parallel trains. Each train consists of ZeeWeed® cassettes, a process pump, piping, instrumentation, and controls. The backpulse pump, blower and clean-in-place equipment can be shared amongst the trains. Feed enters each train from a feed channel that runs along the long side of the train at the bottom of the tank. Reject is collected in troughs between cassettes and is discharged to the overflow channel that runs the length of the tank.

The membrane bioreactor systems preferably employed in the preferred embodiments utilize an effective and efficient membrane cleaning method. Commonly used physical cleaning methods include backwash (backpulse, backflush) using a liquid permeate or a gas, membrane surface scrubbing, and scouring using a gas in the form of bubbles in a liquid. Examples of the second type of method are described in U.S. Pat. No. 5,192,456 to Ishida et al., U.S. Pat. No. 5,248,424 to Cote et al., U.S. Pat. No. 5,639,373 to Henshaw et al., U.S. Pat. No. 5,783,083 to Henshaw et al., and U.S. Pat. No. 6,555,005 to Zha et al.

In the examples referred to above, a gas is injected, usually by a pressurized blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size, and the resultant of forces applied to the bubbles. The fluid transfer in this approach is limited to the effectiveness of the gas lifting mechanism. To enhance the scrubbing effect, more gas has to be supplied. However, this method has several disadvantages: it consumes large amounts of energy, it can form mist or froth flow reducing effective membrane filtration area, and can be destructive to membranes. Moreover, in an environment of high concentration of solids, the gas distribution system can gradually become blocked by dehydrated solids or simply be blocked when the gas flow accidentally ceases.

For most tubular membrane modules, the membranes are flexible in the middle (longitudinal directions) of the modules but tend to be tighter and less flexible towards to both potted heads. When such modules are used in an environment containing high concentrations of suspended solids, solids are easily trapped within the membrane bundle, especially in the proximity of two potted heads. The methods to reduce the accumulation of solids include the improvement of module configurations and flow distribution when gas scrubbing is used to clean the membranes.

In the design of a membrane module, the packing density of the tubular membranes in a module is one factor that is considered. The packing density of the fiber membranes in a membrane module as used herein is defined as the cross-sectional potted area taken up by the fiber membranes divided by the total potted area and is normally expressed as, a percentage. From the economical viewpoint it is desirable that the packing density be as high as possible to reduce the cost of making membrane modules. In practice, solid packing is reduced in a less densely packed membrane module. However, if the packing density is too low, the rubbing effect between membranes could also be lessened, resulting in less efficient scrubbing/scouring of the membrane surfaces. It is, thus desirable to provide a membrane configuration that assists removal of accumulated solids while maximizing packing density of the membranes. The membranes can be in contact with each other (e.g., at high packing densities), or can be closely or distantly spaced apart (e.g., at low packing densities), for example, a spacing between fiber walls of from about 0.1 mm or less to about 10 mm or more is typically employed.

A method of scrubbing a membrane surface using a liquid medium with gas bubbles entrained therein, including the steps of entraining the gas bubbles-into the liquid medium by flow of the liquid medium past a source of the gas, and flowing the gas bubbles and liquid medium along the membrane surface to dislodge fouling materials therefrom, can be employed in membrane bioreactors.

Preferably, the gas bubbles are entrained into the liquid stream by means of a venturi device or other type of junction. For further preference, the gas bubbles are entrained or injected into the liquid stream by means of devices which forcibly mix gas into a liquid flow to produce a mixture of liquid and bubbles, such devices including a jet, nozzle, ejector, eductor, injector or the like. Optionally, an additional source of bubbles can be provided in the liquid medium by means of a blower or like device. The gas used can include air, oxygen, gaseous chlorine, or ozone. Air is the most economical for the purposes of scrubbing and/or aeration. Gaseous chlorine can be used for scrubbing, disinfection, and enhancing the cleaning efficiency by chemical reaction at the membrane surface. The use of ozone, besides the similar effects mentioned for gaseous chlorine, has additional features, such as oxidizing DBP precursors and converting non-biodegradable NOM's to biodegradable dissolved organic carbon.

The membrane modules employed in the membrane bioreactor preferably comprise a plurality of porous membranes arranged in close proximity to one another, optionally mounted to prevent excessive movement therebetween, and include a source of gas bubbles for providing, from within the module gas bubbles entrained in a liquid flow such that, in use, the liquid and bubbles entrained therein move past the surfaces of the membranes to dislodge fouling materials therefrom, the gas bubbles being entrained in the liquid by flowing the liquid past a source of gas to draw the gas into the liquid flow. Preferably, the liquid and bubbles are mixed and then flowed past membranes to dislodge the fouling materials.

The fibers of the membrane bioreactor can be cleaned by providing, from within the array of fibers, by means other than gas passing through the pores of the membranes, uniformly distributed gas-bubbles entrained in a liquid flow, the gas bubbles being entrained in the liquid flow by flowing the liquid past a source of gas so as to cause the gas to be drawn and/or mixed into the liquid, the distribution being such that the bubbles pass substantially uniformly between each membrane in the array to, in combination with the liquid flow, scour the surface of the membranes and remove accumulated solids from within the membrane module. Preferably, the bubbles are injected and mixed into the liquid flow.

Preferably, the membranes of the membrane bioreactor comprise porous hollow fibers, the fibers being fixed at each end in a header, the lower header having one or more holes formed therein through which gas liquid flow is introduced. The holes can be circular, elliptical or in the form of a slot. The fibers are normally sealed at the lower end and open at their upper end to allow removal of filtrate, however, in some arrangements, the fibers can be open at both ends to allow removal of filtrate from one or both ends. The fibers are preferably arranged in cylindrical arrays or bundles, however other configurations can also be employed, e.g., square, hexagonal, triangular, irregular, and the like. It will be appreciated that the cleaning process described is equally applicable to other forms of membrane such flat or plate membranes that can also be employed in membrane bioreactors.

The membrane modules employed in the membrane bioreactor preferably comprise a plurality of porous hollow fiber membranes, the fiber membranes being arranged in close proximity to one another and mounted to prevent excessive movement therebetween, the fiber membranes being fixed at each end in a header, one header having one or more of holes formed therein through which gas/liquid flow is introduced, and partition means extending at least part way between the headers to partition the membrane fibers into groups. Preferably, the partition or partitions are formed by a spacing between respective fiber groups, however porous (e.g., a screen, clip, or ring) or solid partitions can also be employed. The partitions can be parallel to each other or, in the case of cylindrical arrays of fiber membranes, the partitions can extend radially from the center of the array or be positioned concentrically within the cylindrical array. In an alternative form, the fiber bundle can be provided with a central longitudinal passage extending the length of the bundle between the headers.

The membrane modules employed in a membrane bioreactor preferably include a plurality of porous hollow membrane fibers extending longitudinally between and mounted at each end to a respective potting head, the membrane fibers being arranged in close proximity to one another and mounted to prevent excessive movement therebetween, the fibers being partitioned into a number of bundles at least at or adjacent to their respective potting head so as to form a space therebetween, one of the potting heads having an array of aeration openings formed therein for providing gas bubbles within the module such that, in use, the bubbles move past the surfaces of the membrane fibers to dislodge fouling materials therefrom.

The fiber bundle can be protected and fiber movement can be limited by a module support screen which has both vertical and horizontal elements appropriately spaced to provide unrestricted fluid and gas flow through the fibers and to restrict the amplitude of fiber motion reducing energy concentration at the potted ends of the fibers. Alternatively, clips or rings can also be employed to bind the fiber bundle.

Preferably, the aeration openings are positioned to coincide with the spaces formed between the partitioned bundles. Preferably, the openings comprise one or more holes or slots, which can be arranged in various configurations, e.g., a row of holes. Preferably, the fiber bundles are located in the potting head between the slots or rows of holes. In certain embodiments, it can be preferred to situate the holes or slots within the fiber bundles, or both within and adjacent to the fiber bundles.

Preferably, the gas bubbles are entrained or mixed with a liquid flow before being fed through the holes or slots, though it will be appreciated that gas only can be used in some configurations. The liquid used can be the feed to the membrane module. The fibers and/or fiber bundles can cross over one another between the potting heads though it is desirable that they do not.

Typically, the fibers within the module have a packing density (as defined above) of from about 5% or less to about 75% or more, preferably from about 6, 7, 8, 9, or 10% to about 60, 65, or 70%, and more preferably from about 11, 12, 13, 14, 15, 16, 17, 18, 19, or 20% to about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55%.

Preferably, the holes have a diameter of from about 0.5 mm or less to about 50 mm or more, more preferably from about 0.6, 0.7, 0.8, 0.9, 1.0, 1.1, 1.2, 1.3, 1.4, or 1.5 to about 25, 30, 35, 40, or 45 mm, and most preferably from about 1.75, 2.0, 2.5, 3.0, 3.5, 4.0, 4.5, or 5.0 mm to about 6, 7, 8, 9, 10, 11, 12, 13, 14, 15, 16, 17, 18, 19, 20, 21, 22, 23, or 24 mm. In the case of a slot or row of holes, the open area is chosen to be equivalent to that of the above holes.

Typically, the fiber inner is from about 0.05 mm or less to about 10 mm or more, preferably from about 0.10, 0.15, or 0.20 mm to about 3, 4, 5, 6, 7, 8, or 9 mm, and preferably from about 0.25, 0.50, 0.75, or 1.0 mm to about 1.25, 1.50, 1.75, 2.00, or 2.50 mm. The fibers wall thickness can depend on materials used and strength required versus filtration efficiency. Typically, wall thickness is from about 0.01 mm or less to about 3 mm or more, preferably from about 0.02, 0.03, 0.04, 0.05, 0.06, 0.07, 0.08, or 0.09 mm to about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 mm, and most preferably from about 0.1, 0.2, 0.3, 0.4, or 0.5 mm to about 0.6, 0.7, 0.8, 0.9, or 1 mm.

The membrane bioreactor can include a tank having a line, a pipe, a pump, and or other apparatus for the introduction of feed thereto, an activated sludge within the tank, a membrane module positioned within the tank so as to be immersed in the sludge, and apparatus for withdrawing filtrate from at least one end of the fiber membranes.

The membrane bioreactor is preferably operated by introducing feed to the tank, applying a vacuum to the fibers to withdraw filtrate therefrom while intermittently, cyclically, or continuously supplying gas bubbles through the aeration openings to within the module such that, in use, the bubbles move past the surfaces of the membrane fibers to dislodge fouling materials therefrom. Preferably, the gas bubbles are entrained or mixed with a liquid flow when fed through the holes or slots.

If desired, a further source of aeration can be provided within the tank to assist microorganism activity. Preferably, the membrane module is suspended vertically within the tank and the further source of aeration can be provided beneath the suspended module. Alternatively, the module can be suspended horizontally, or in any other desired position. Preferably, the further source of aeration comprises a group of air permeable tubes or other such aeration source. The membrane module can be operated with or without backwash, depending on the flux. A high mixed liquor of suspended solids (about 5,000 ppm or less to about 20,000 ppm or more) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing, high concentration of mixed liquor suspended solids (MLSS). The use of partitioned fiber bundles enables higher packing densities to be achieved without significantly compromising the gas scouring process. This provides for higher filtration efficiencies to be gained.

Figure 3:
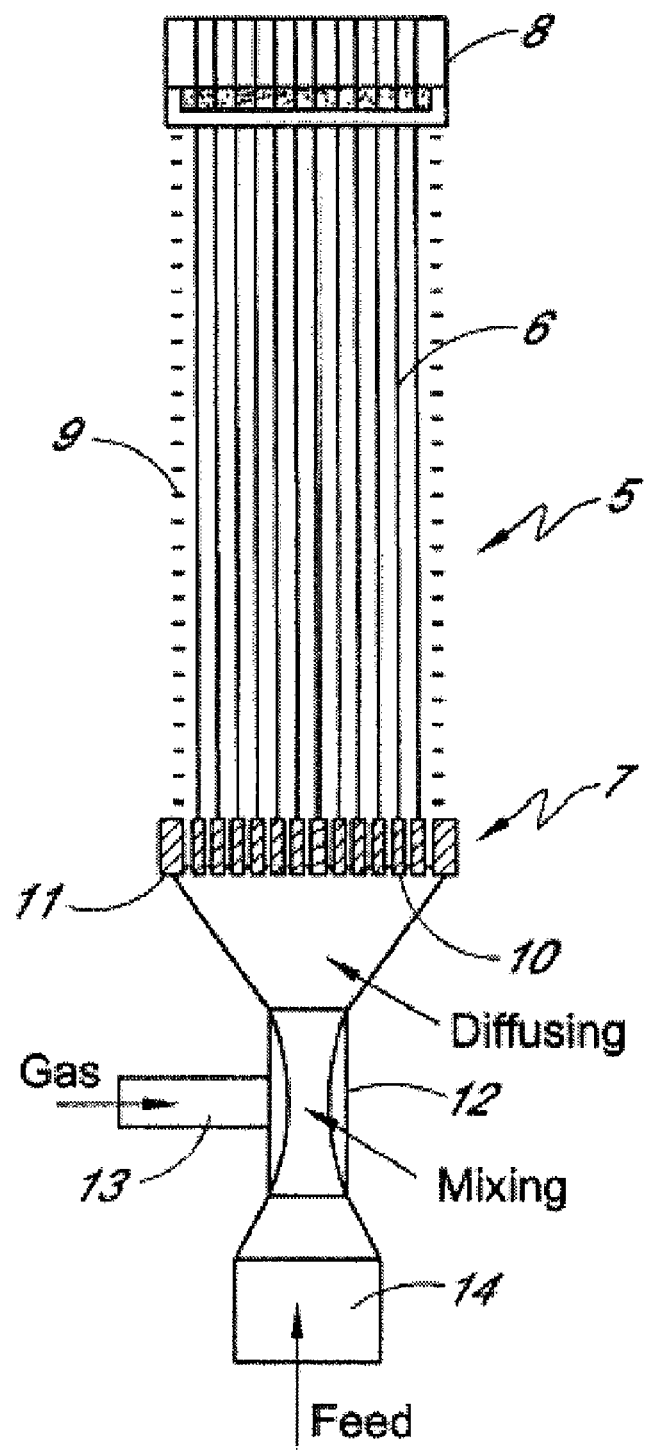
FIG. 3 shows a schematic side elevation of one embodiment of a membrane module and illustrates the method of cleaning in a membrane bioreactor employed in the filtration apparatus of a preferred embodiment.

In a particularly preferred embodiment, a module as described in U.S. Pat. No. 6,555,005 is employed in the membrane bioreactor. Referring to FIG. 3, the membrane module 5 typically comprises fiber, tubular, or flat sheet form membranes 6 pofted at two ends 7 and 8 and optionally encased in a support structure, in this case a screen 9. Either one or both ends of the membranes can be used for the permeate collection. The bottom of the membrane module has a number of through apertures 10 in the pot 11 to distribute a mixture of gas and liquid feed past the membrane surfaces. A venturi device 12 or the like is connected to the base of the module. The venturi device 12 intakes gas through inlet 13, mixes or entrains the gas with liquid flowing through feed inlet 14, forms gas bubbles and diffuses the liquid/gas mix into the module apertures 10. After passing through the distribution apertures 10, the entrained gas bubbles scrub membrane surfaces while travelling upwards along with the liquid flow. Either the liquid feed or the gas can be a continuous or intermittent injection depending on the system requirements. With a venturi device it is possible to create gas bubbles and aerate the system without a blower. The venturi device 12 can be a venturi tube, jet, nozzle, ejector, eductor, injector, or the like.

Figure 4:
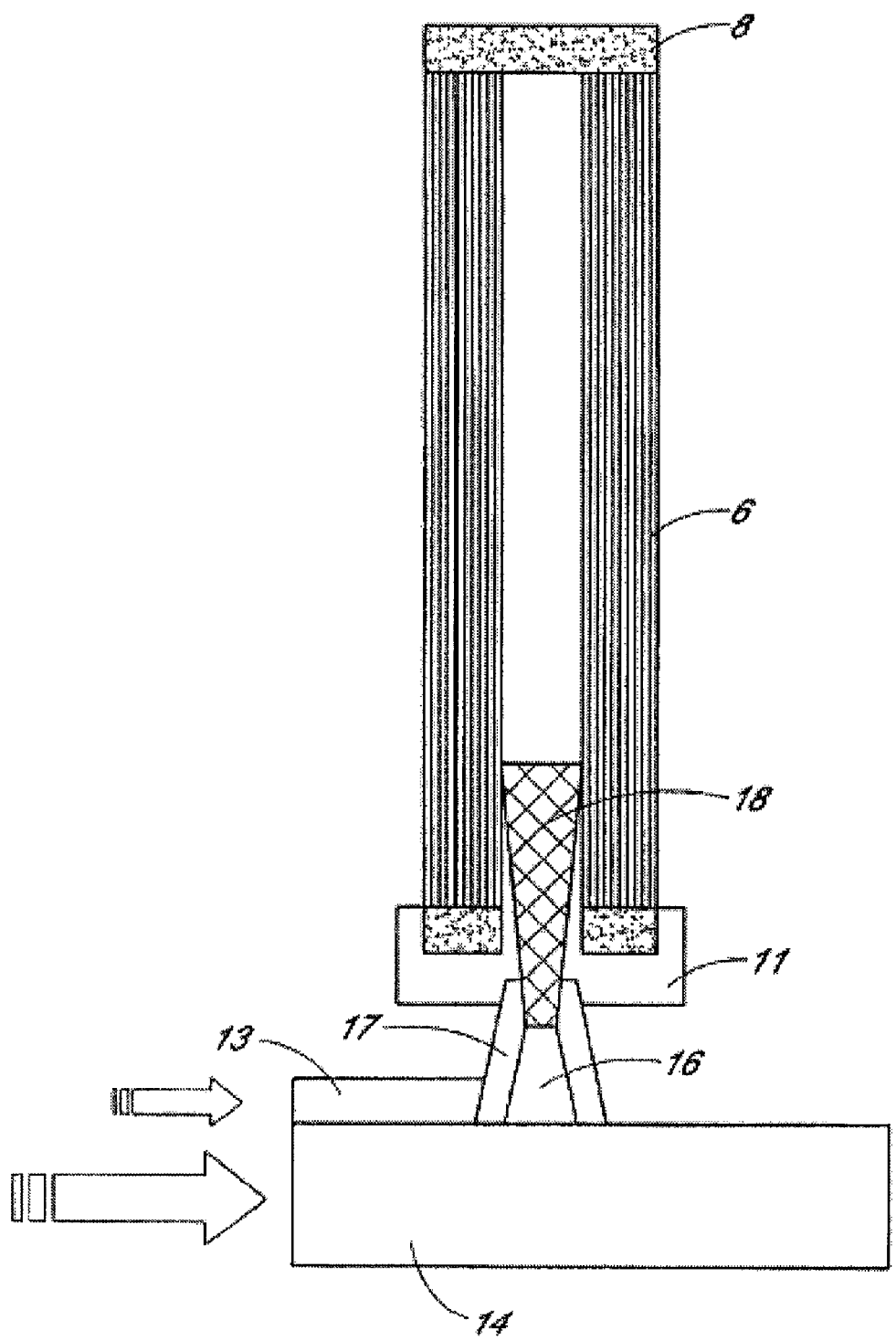
FIG. 4 shows an enlarged schematic side elevation of one form of the jet type arrangement used to form entrained gas bubbles of a membrane bioreactor employed in the filtration apparatus of a preferred embodiment.

Referring to FIG. 4, an enlarged view of jet or nozzle type device 15 is shown. In this embodiment, liquid is forced through a jet 16 having a surrounding air passage 17 to produce a gas entrained liquid flow 18. Such a device allows the independent control of gas and liquid medium-by adjusting respective supply valves.

The liquid commonly used to entrain the gas is the feed water, wastewater, or mixed liquor to be filtered. Pumping such an operating liquid through a venturi or the like creates a vacuum to suck the gas into the liquid, or reduces the gas discharge pressure when a blower is used. By providing the gas in a flow of the liquid, the possibility of blockage of the distribution apertures 10 is substantially reduced.

By using a venturi device or the like it is possible to generate gas bubbles to scrub membrane surfaces without the need for a pressurized gas supply such as a blower. When a motive fluid passes through a venturi it generates a vacuum to draw the gas into the liquid flow and generate gas bubbles therein. Even if a blower is still required, the use of the above process reduces the discharge pressure of the blower and therefore lowers the cost of operation. The liquid and gas phases are well mixed in the venturi and then diffuse into the membrane module to scrub the membranes. Where a jet type device is used to forcibly mix the gas into the liquid medium, an additional advantage is provided in that a higher velocity of bubble stream is produced. In treatment of wastewater, such thorough mixing provides excellent oxygen transfer when the gas used is air or oxygen. If the gas is directly injected into a pipe filled with a liquid, it is impossible that the gas will form a stagnant gas layer on the pipe wall and therefore gas and liquid will bypass into different parts of a module, resulting in poor cleaning efficiency. The flow of gas bubbles is enhanced by the liquid flow along the membrane resulting in a large scrubbing shear force being generated. This method of delivery of gas/liquid provides a positive fluid transfer and aeration with the ability to independently adjust flow rates of gas and liquid. The injection of a mixture of two-phase fluid (gas/liquid) into the holes of the air distribution device can eliminate the formation of dehydrated solids and therefore prevent the gradual blockage of the holes by such dehydrated solids. The injection arrangement further provides an efficient cleaning mechanism for introducing cleaning chemicals effectively into the depths of the module while providing scouring energy to enhance chemical cleaning. This arrangement, in combination with the high packing density obtainable with the module configuration described, enables the fibers to be effectively cleaned with a minimal amount of chemicals. The module configuration described allows a higher fiber packing density in a module without significantly increasing solid packing. This adds an additional flexibility that the membrane modules can be either integrated into the aerobic basin or arranged in a separate tank. In the latter arrangement, the advantage is a significant saving on chemical usage due to the small chemical holding in the tank and in labor costs because the chemical cleaning process can be automated. The reduction in chemicals used is also important because the chemicals, which can be fed back to the bio process, are still aggressive oxidizers and therefore can have a deleterious effect on bio process. Accordingly, any reduction in the chemical load present in the bio-process provides significant advantages.

The positive injection of a mixture of gas and liquid feed to each membrane module provides a uniform distribution of process fluid around membranes and therefore minimizes the feed concentration polarization during filtration. The concentration polarization is greater in a large-scale system and for the process feed containing large amounts of suspended solids. The prior art systems have poor uniformity because the process fluid often enters one end of the tank and concentrates as it moves across the modules. The result is that some modules must deal with much higher concentrations than others, resulting in inefficient operation. The filtration efficiency is enhanced due to a reduced filtration resistance. The feed side resistance is decreased due to a reduced transverse flow passage to the membrane surfaces and the turbulence generated by the gas bubbles and the two-phase flow. Such a cleaning method can be used to the treatment of drinking water, wastewater, and the related processes by membranes. The filtration process can be driven by suction or pressurization.

Referring to FIGS. 5 to 6, embodiments of various partitioning arrangements are shown. Again these embodiments are illustrated with respect to cylindrical tubular or fiber membrane bundles 20, however, it will be appreciated that other configurations can be employed. FIGS. 5a and 5b show a bundle of tubular membranes 20 partitioned vertically into several thin slices 21 by a number of parallel partition spaces 22. This partitioning of the bundle enables accumulated solids to be removed more easily without significant loss of packing density. Such partitioning can be achieved during the potting process to form complete partitions or partial partitions. Another method of forming a partitioned module is to pot several small tubular membrane bundles 23 into each module as shown in FIGS. 5a and 5b.

Figure 7A:
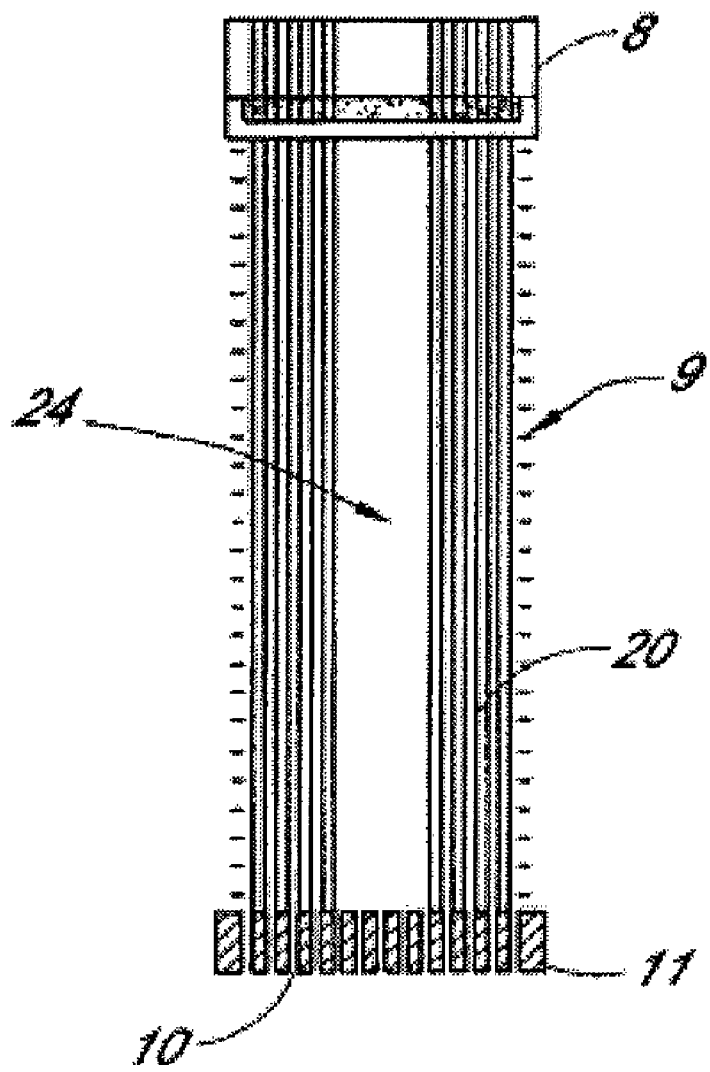
FIG. 7a shows a schematic side elevation of a partitioned membrane module of a membrane bioreactor employed in the filtration apparatus of a preferred embodiment.
Figure 7B:
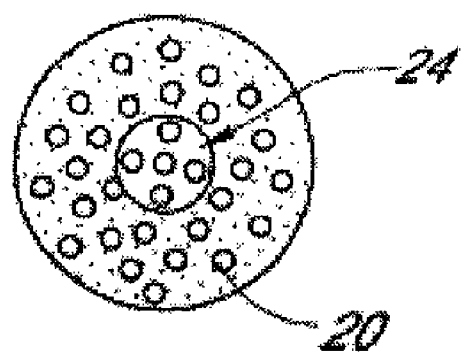

Another configuration of membrane module is illustrated in FIGS. 7a and 7b. The central membrane-free zone forms a passage 24 to allow for more air and liquid injection. The gas bubbles and liquid then travel along the tubular membranes 20 and pass out through arrays of fibers at the top potted head 8, scouring and removing solids from membrane walls. A single gas or a mixture of gas/liquid can be injected into the module.

Figure 8A:
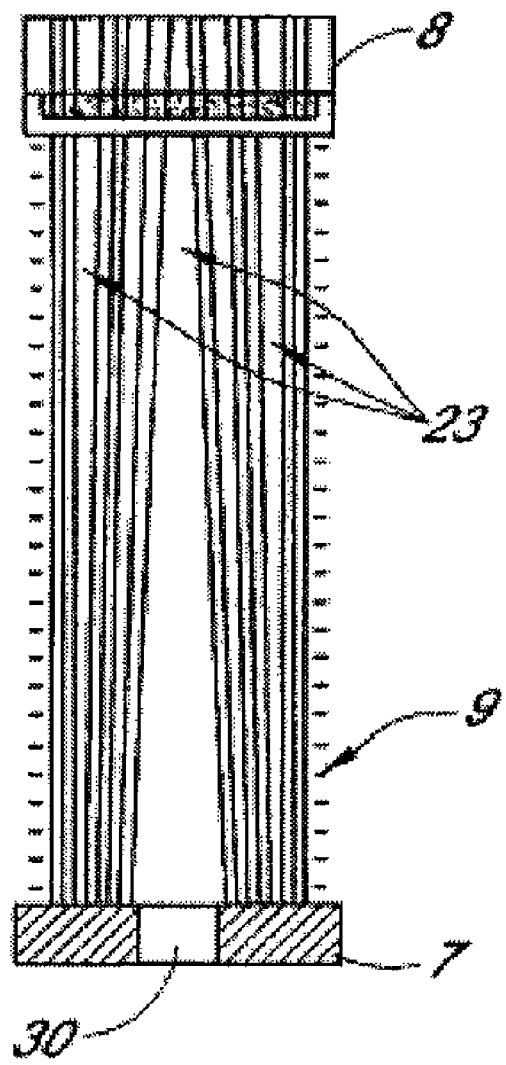
FIG. 8a shows a schematic side elevation of a partitioned membrane module of a membrane bioreactor employed in the filtration apparatus of a preferred embodiment.
Figure 8B:
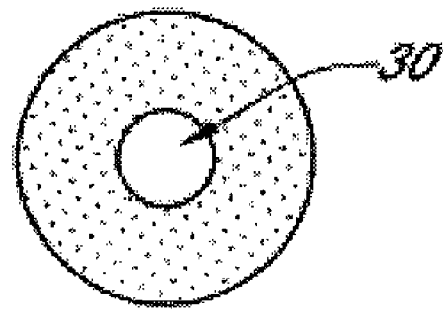

FIGS. 8a and 8b illustrate yet a further embodiment similar to FIG. 4 but with single central hole 30 in the lower pot 7 for admission of the cleaning liquid/gas mixture to the fiber membranes 20. In this embodiment, the fibers are spread adjacent the hole 30 and converge in discrete bundles 23 toward the top pot 8. The large central hole 30 has been found to provide greater liquid flow around the fibers and thus improved cleaning efficiency.

Figure 9:
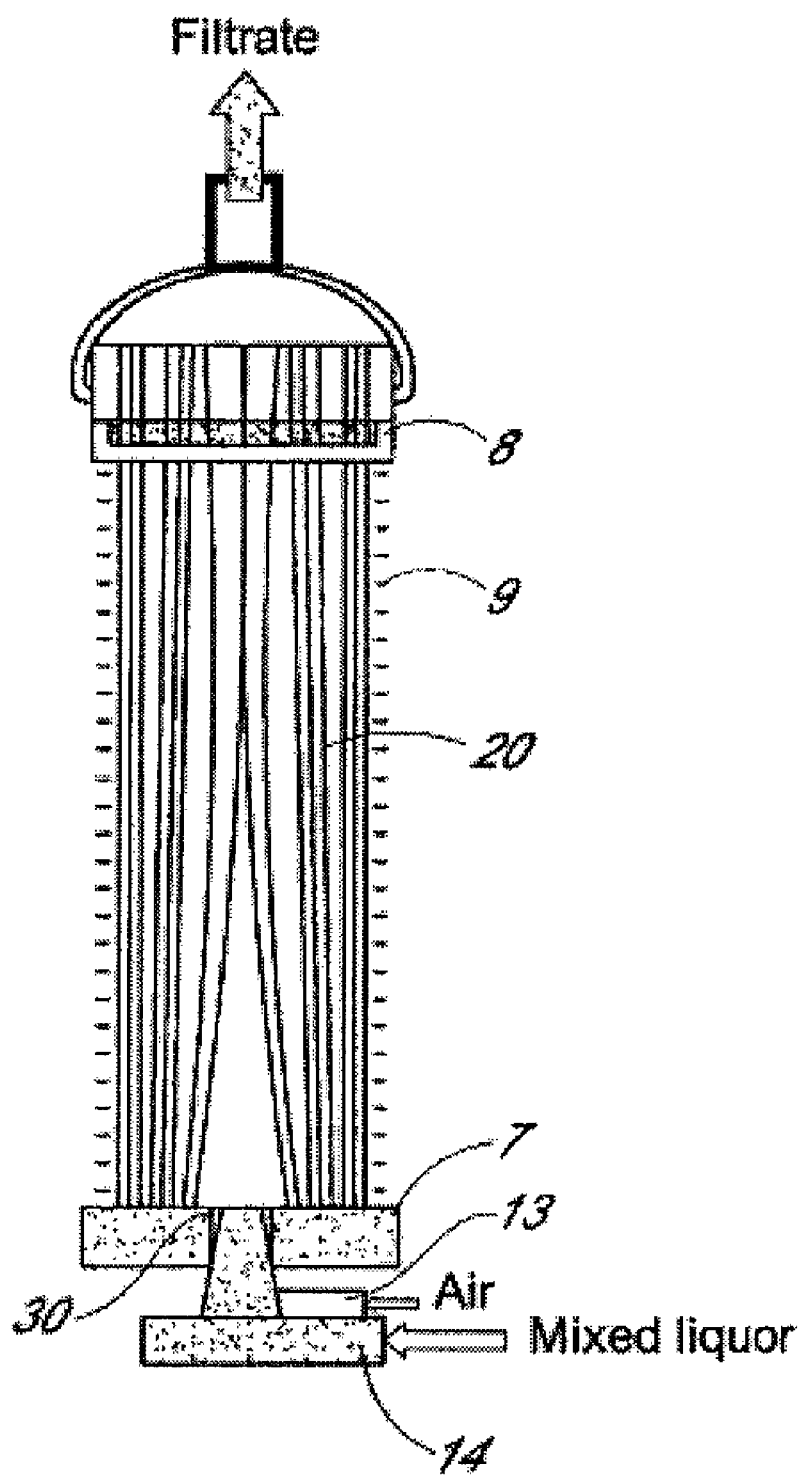
FIG. 9 shows a similar view to FIG. 8 of a membrane module.
Figure 10:
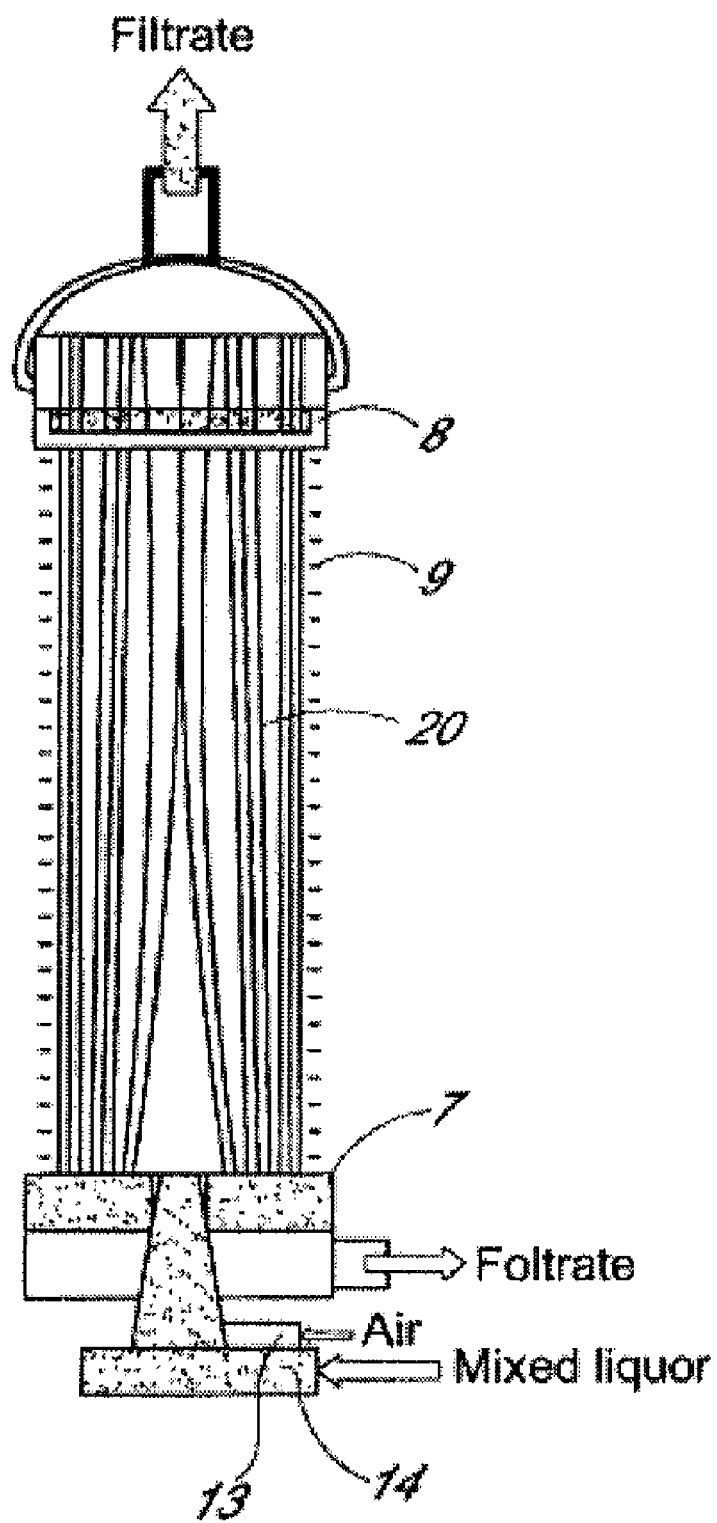
FIG. 10 shows a similar view to FIG. 8 of a membrane module.

FIGS. 9 and 10 show further embodiments of the invention having a similar membrane configuration to that of FIGS. 8a and 8b and jet mixing system similar to that of the embodiment of FIG. 4. The use of a single central hole 30 allows filtrate to drawn off from the fibers 20 at both ends as shown in FIG. 10.

Figure 11:
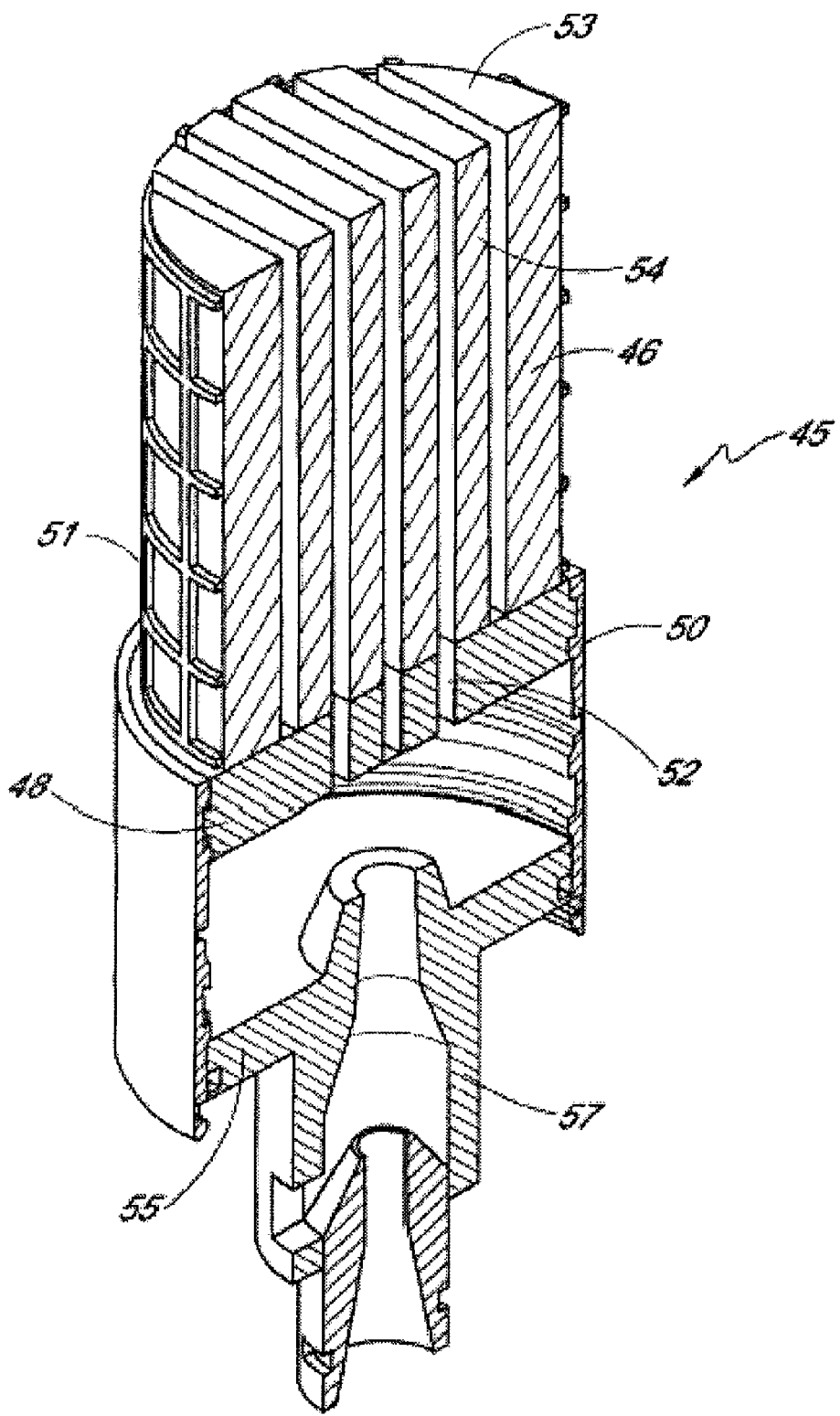
FIG. 11 shows a sectioned perspective pictorial view of the lower end of another preferred embodiment of the membrane module of a membrane bioreactor employed in the filtration apparatus of a preferred embodiment.
Figure 12:
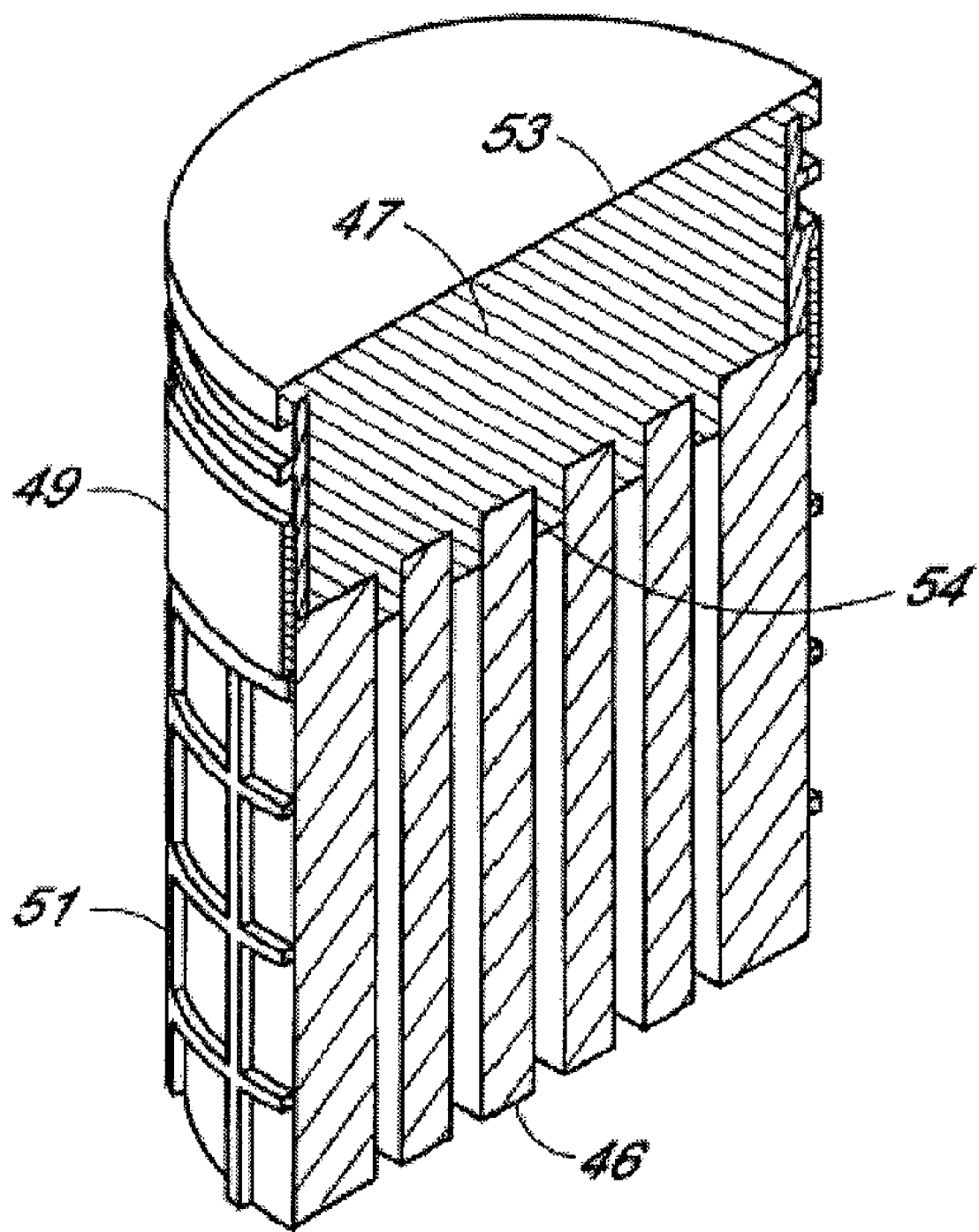
FIG. 12 shows a sectioned perspective pictorial view of the upper end of the membrane module of FIG. 11.

Referring to FIGS. 11 and 12 of the drawings, the module 45 comprises a plurality of hollow fiber membrane bundles 46 mounted in and extending between an upper 47 and lower potting head 8. The potting heads 47 and 48 are mounted in respective potting sleeves 49 and 50 for attachment to appropriate manifolding (not shown). The fiber bundles 46 are surrounded by a screen 51 to prevent excessive movement between the fibers.

As shown in FIG. 11, the lower potting head 48 is provided with a number of parallel arranged slot type aeration holes 52. The fiber membranes 53 are potted in bundles 46 to form a partitioned arrangement having spaces 54 extending transverse of the fiber bundles. The aeration holes 52 are positioned to generally coincide with the partition spaces, though there is generally a number of aeration holes associated with each space.

The lower potting sleeve 50 forms a cavity 55 below the lower pot 48. A gas or a mixture of liquid and gas is injected into this cavity 55, by a jet assembly 57 (described earlier) before passing through the holes 52 into the membrane array.

In use, the use of partitioning enables a high energy flow of scouring gas and liquid mixture, particularly near the pot ends of the fiber bundles, which assist with removal of buildup of accumulated solids around the membrane fibers.

Air is preferably introduced into the module continuously to provide oxygen for microorganism activities and to continuously scour the membranes. Alternatively, in some embodiments, pure oxygen or other gas mixtures can be used instead of air. The clean filtrate is drawn out of the membranes by a suction pump attached to the membrane lumens that pass through the upper pot, or the filtrate can be drawn out of the membranes from the lower pot by gravity or suction pump.

Preferably, the membrane module is operated under low transmembrane pressure (TMP) conditions due to the high concentration of mixed liquor suspended solids (MLSS) present in the reactor. Higher transmembrane pressure can advantageously be employed for reduced concentrations of suspended solids.

It has been found that the module system of preferred embodiments is more tolerant of high MLSS than many other systems and the efficient air scrub and back wash (when used) assists efficient operation and performance of the bioreactor module.

Any suitable membrane bioreactor can be employed in the water treatment systems of the preferred embodiments. A particularly preferred membrane bioreactor system is designed to draw filtrate from a reservoir of liquid substrate by the use of vertically oriented microporous hollow fibers immersed within the substrate.

Any suitable substrate can be filtered using the methods and apparatus of the preferred embodiments. Suitable substrates include, but are not limited to, ground water, river water, drinking water, organic-containing substrates such as sewage, agricultural run-off, industrial process water, and the like. While water-containing substrates are particularly amenable to the methods and apparatus described herein, substrates containing other liquids can also be filtered (e.g., ethanol, or other chemicals).

The membrane bioreactor filtration unit includes a filtrate sub-manifold and an air/liquid substrate sub-manifold, which receive the upper and lower ends, respectively, of four sub-modules. Each sub-manifold includes four circular fittings or receiving areas, each of which receives an end of one of the sub-modules. Each sub-module is structurally defined by a top cylindrical pot, a bottom cylindrical pot, and a cage connected therebetween to secure the fibers. The pots secure the ends of the hollow fibers and are formed of a resinous or polymeric material. The ends of the cage are fixed to the outer surfaces of the pots. Each pot and associated end of the cage are together received within one of the four circular fittings of each sub-manifold. The sub-manifolds and pots of the sub-modules are coupled together in a fluid-tight relationship with the aid of circular clips and O-ring seals. The cage provides structural connection between the pots of each sub-module.

Each sub-module includes fibers arranged vertically between its top and bottom pot. The fibers have a length somewhat longer than the distance between the pots, such that the fibers can move laterally. The cage closely surrounds the fibers of the sub-module so that, in operation, the outer fibers touch the cage, and lateral movement of the fibers is restricted by the cage. The lumens of the lower ends of the fibers are sealed within the bottom pot, while the upper ends of the fibers are not sealed. In other words, the lumens of the fibers are open to the inside of the filtrate sub-manifold above the upper face of the top pot. The bottom pot includes a plurality of slots extending from its lower face to its upper face, so that the mixture of air bubbles and liquid substrate in the air/liquid substrate sub-manifold can flow upward through the bottom pot to be discharged between the lower ends of the fibers.

The filtrate sub-manifold is connected to a vertically oriented filtrate withdrawal tube that in turn connects to a filtrate manifold that receives filtrate from all of the filtration units of a rack. The filtrate withdrawal tube is in fluid communication with the upper faces of the top pots of the sub-modules, so that filtrate can be removed through the withdrawal tube. In addition, the system includes an air line that provides air to the air/liquid substrate sub-module skirt.

In operation, the cages of the sub-modules admit the liquid substrate into the region of the hollow fibers, between the top and bottom pots. A pump is utilized to apply suction to the filtrate manifold and, thus, the filtrate withdrawal tubes and fiber lumens of the sub-modules. This creates a pressure differential across the walls of the fibers, causing filtrate to pass from the substrate into the lumens of the fibers. The filtrate flows upward through the fiber lumens into the filtrate sub-manifold, through the filtrate withdrawal tube, and upward into the filtrate manifold to be collected outside of the reservoir.

During filtration, particulate matter accumulates on the outer surfaces of the fibers. As increasing amounts of particulate matter stick to the fibers, it is necessary to increase the pressure differential across the fiber walls to generate sufficient filtrate flow. To maintain cleanliness of the outer surfaces of the fibers, air and liquid substrate are mixed in the skirt of the air/liquid substrate sub-module and the mixture is then distributed into the fiber bundles through the slots of the bottom pots and is discharged as a bubble-containing mixture from the upper faces of the bottom pots. Continuous, intermittent, or cyclic aeration can be conducted. It is particularly preferred to conduct cyclic aeration, wherein the air on and air off times are of equal length, and the total cycle time (time of one air on and one air off period), is from about 1 second or less to about 15 minutes or more, preferably from about 2, 3, 4, 5, 6, 7, 8, 9, 10, 11, 12, 13, or 14 second to about 6, 7, 8, 9, 10, 11, 12, 13, or 14 minutes, and more preferably from about 15, 20, 25, 30, 35, 40, 45, 50, 55, 60, 65, 70, 75, 80, 85, 90, 95, 100, 105, 110, 115, or 120 seconds to about 130, 140, 150, 160, 170, 180, 190, 200, 210, 220, 230, 240, 250, 260, 270, 280, 290, or 300 seconds. The rising bubbles scour (i.e., clean particulate matter from) the fiber surfaces. Aeration wherein the air is provided in uniform bubble sizes can be provided, or a combination of different bubble sizes can be employed, for example, coarse bubbles or fine bubbles, simultaneously or alternately. Regular or irregular cycles (in which the air on and air off times vary) can be employed, as can sinusoidal, triangular, or other types of cycles, wherein the rate of air is not varied in a discontinuous fashion, but rather in a gradual fashion, at a preferred rate or varying rate. Different cycle parameters can be combined and varied, as suitable.

In a particularly preferred embodiment, fine bubbles are continuously provided to the membrane bioreactor for aeration, while coarse bubbles are provided cyclically for scouring. Bubbles are typically from about 0.1 or less to about 50 mm or more in diameter. Bubbles from about 0.1 to about 3.0 mm in diameter, preferably from about 0.2, 0.3, 0.4, 0.5, 0.6, 0.7, 0.9, 0.9, or 1.0 mm to about 1.25, 1.50, 1.75, 2.00, 2.25, 2.50 or 2.75 mm in diameter are particularly effective in providing oxygen to the bioreactor. Bubbles of from about 20 to about 50 mm in diameter, preferably from about 25, 30, or 35 to about 40 or 45 mm in diameter, are particularly effective in scouring the membranes. Bubbles of from about 3 to about 20 mm in diameter, preferably from about 4, 5, 6, 7, 8, 9, or 10 mm to about 11, 12, 13, 14, 15, 16, 17, 18, or 19 mm in diameter, are generally preferred as providing both acceptable oxygenation and scouring.

Figure 13:
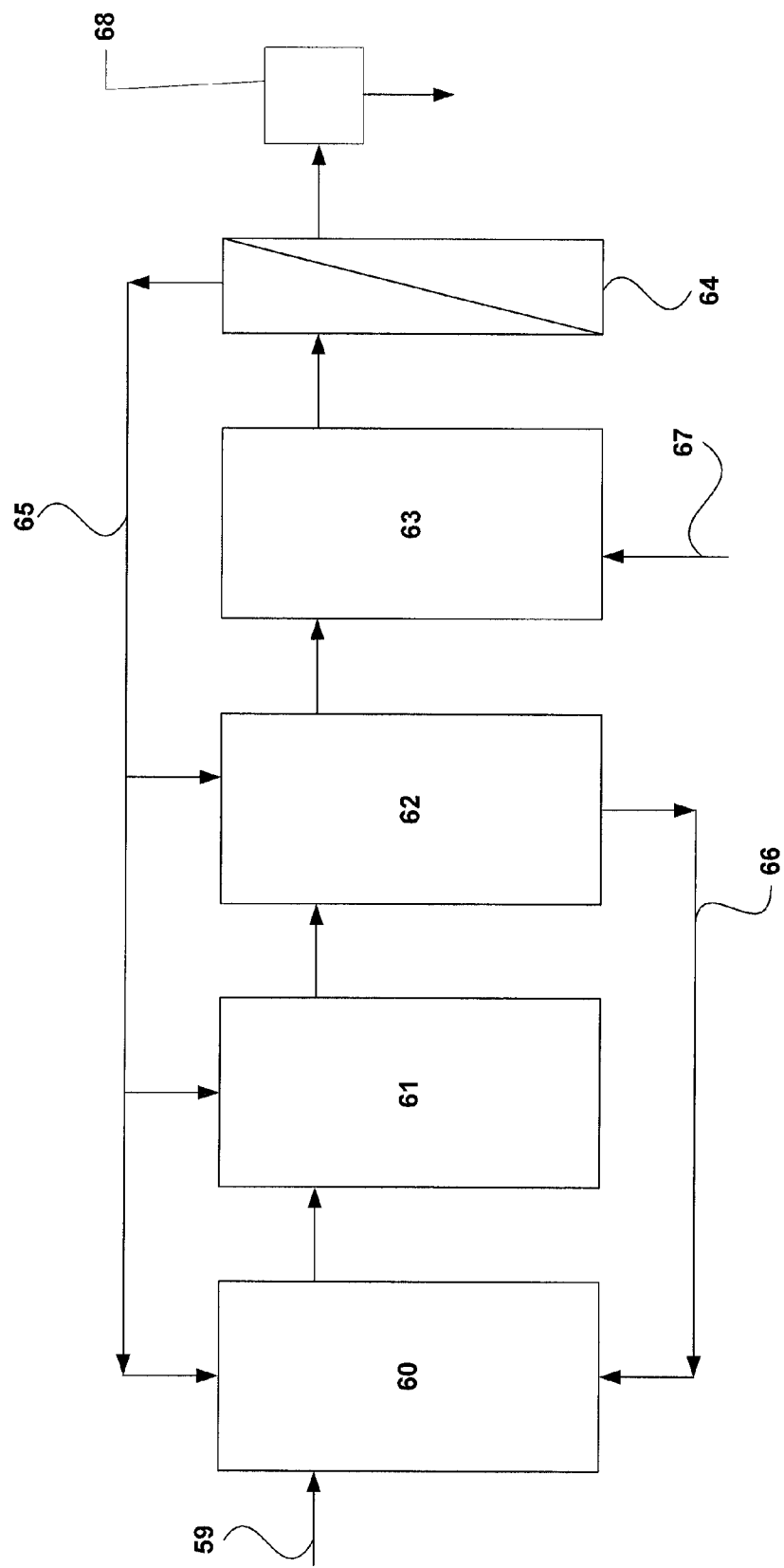
FIG. 13 illustrates a schematic view of an improved wastewater treatment system of another embodiment of the invention.

Referring to FIG. 13, another embodiment of the invention is shown. In this embodiment the wastewater is fed through a conduit 59 into an anoxic reactor or reactors 60, which preferably utilize a mechanical mixer (not shown) to keep solids in suspension without aeration. The anoxic reactor 60 is fluidly connected to three further treatment reactors 61, 62, 63 connected in series. Treatment reactor 63 is fluidly connected to a membrane filter 64 of the type described above. Activated sludge collected by the membrane filter 64 is returned to the anoxic reactor 60 and further reactors 61 and 62 via return line 65. A portion of mixed liquor may be returned to anoxic zone 60 from treatment reactor 62 through nitrate return line 66. Treatment reactor 63 is typically operated as an anoxic zone with an input line 67 for selective carbon dosing to assist nitrate removal. The carbon dosing may be controlled by providing an online nitrate analyser 68 at the output from the membrane filter 64 to measure nitrate levels and feed back a signal to control carbon dosing to the second anoxic reactor 63.

The arrangement shown in this embodiment allows the dissolved oxygen contained in the liquid fed back from the membrane filter 64 to be selectively directed to the anoxic reactor 60 and used for simultaneous nitrification and denitrification of mixed liquor in the reactor 60 when the load to the treatment system is that required for operating at optimal conditions. If the load is significantly less than the optimal load, the mass of dissolved oxygen in the return flow may exceed that which can be consumed by bacteria in the anoxic reactor 60. For this condition, this embodiment provides the ability for the return flow to be selectively directed to one or more of the further reactors downstream of the anoxic reactor 60 with nitrates being recirculated from further reactor 62 to the anoxic reactor 60 to be denitrified after at least some of the dissolved oxygen in the return flow from the membrane filter 64 has been consumed by bacteria in the downstream further reactors 61 and 62.

In one form of this embodiment, the return flow from the membrane filter 64 is directed to reactor 62 which is operated as an aerobic zone with reactor 61 operated as an aerobic zone. This allow some of the dissolved oxygen in the return flow to removed by the bacteria in the mixed liquor contained in reactor 62 before it is returned to the anoxic reactor 60. This arrangement ensures a stronger anoxic condition in anoxic reactor 60 for promoting faster denitrification.

In another form of this embodiment, the return flow from the membrane filter 64 is directed to reactor 61 which is operated as an aerobic zone with reactor 62 operated as an anoxic zone. This arrangement serves to further reduce the amount of dissolved oxygen recirculated to the anoxic reactor 60.

As can be seen from above a variety of different combinations of further reactors operating as different biological treatment zones may be used without departing from the spirit and scope of the invention described.

Optionally, a mixing device may be employed in the anoxic reactor 60 to improve mixing of the influent and the activated sludge. When the influent wastewater strength is low and/or the ratio of influent total suspended solids (TSS) to influent biochemical oxygen demand (BOD) is high, it may be difficult to maintain an oxygen deficit in the anoxic zone of the anoxic reactor 60 if an aeration device used for mixing. For such applications, it may be desirable to use a mechanical mixer in the anoxic reactor 60. It will be appreciated that one or more of the downstream reactors may still be operated as aerated-anoxic reactors to realize energy savings and faster removal of nitrogen. Aeration may be provided intermittently during periods of high load.

All references cited herein are incorporated herein by reference in their entirety, and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A process for treating BOD, nitrogen, and phosphorus containing wastewater, the process comprising:
   providing wastewater influent into an anoxic zone having activated sludge;
   mixing the wastewater influent with the activated sludge in the anoxic zone to form a first mixed liquor;
   providing the first mixed liquor into a first of a plurality of further treatment zones;
   mixing the first mixed liquor with activated sludge in the first of the plurality of further treatment zones to form a second mixed liquor;
   providing the second mixed liquor into a second of the plurality of further treatment zones;
   mixing the second mixed liquor with activated sludge in the second of the plurality of further treatment zones to form a third mixed liquor;
   providing the third mixed liquor into a third of the plurality of further treatment zones;
   mixing the third mixed liquor with activated sludge in the third of the plurality of further treatment zones to form a fourth mixed liquor;
   transferring a portion of the fourth mixed liquor from the third of the plurality of further treatment zones to a membrane bioreactor;
   filtering the fourth mixed liquor to form a filtrate and an activated sludge; and selectively recycling at least a portion of the activated sludge from the membrane bioreactor to at least one of the anoxic zone, the first of the plurality of further treatment zones, and the second of the plurality of further treatment zones.

2. The process according to claim 1, wherein the portion of recycled activated sludge includes dissolved oxygen.

3. The process according to claim 2, wherein the dissolved oxygen content of the recycled activated sludge is less than 8 mg/L.

4. The process according to claim 2, wherein the dissolved oxygen content of the recycled activated sludge is in a range of from about 4 mg/L to about 8 mg/L.

5. The process according to claim 1, wherein the anoxic zone promotes simultaneous nitrification and denitrification.

6. The process according to claim 1, further comprising recycling a portion of mixed liquor from the second of the plurality of further treatment zones to the anoxic zone for mixing therein with the wastewater and the recycled activated sludge.

7. The process according to claim 1, wherein one of said plurality of further treatment zones is a further anoxic zone.

8. The process according to claim 7, further comprising providing a source of carbon to the further anoxic zone.

9. The process according to claim 8, further comprising measuring nitrate levels in the filtrate and controlling the source of carbon provided to the further anoxic zone in dependence on the measured nitrate levels.

10. The process of claim 7, wherein the second of the plurality of further treatment zones is an anoxic zone.

11. The process of claim 7, wherein the second of the plurality of further treatment zones is an aerobic zone.

12. The process of claim 1, wherein mixing the wastewater influent with the activated sludge in the anoxic zone comprises mixing the wastewater influent and the activated sludge in the anoxic zone with a mixing device.

13. The process of claim 12, wherein solids are maintained in suspension in the anoxic zone without aeration, the anoxic zone promotes simultaneous nitrification and denitrification, and oxygen utilized for nitrification is provided by the recycled activated sludge.

14. A process for treating BOD, nitrogen and phosphorus containing wastewater, the process comprising the steps of:
    providing wastewater influent into a first anoxic zone having activated sludge;
    mixing the wastewater influent with the activated sludge in the first anoxic zone to form a first mixed liquor;
    transferring at least a portion of the first mixed liquor into an aerobic zone;
    mixing the at least a portion of the first mixed liquor with activated sludge in the aerobic zone to form a second mixed liquor;
    transferring at least a portion of the second mixed liquor into a second anoxic zone;
    mixing the at least a portion of the second mixed liquor with activated sludge in the second anoxic zone to form a third mixed liquor;
    transferring at least a portion of the third mixed liquor into a third anoxic zone;
    mixing the at least a portion of the third mixed liquor with activated sludge in the third anoxic zone to form a fourth mixed liquor;
    transferring a portion of the fourth mixed liquor from the third anoxic zone to a membrane bioreactor;
    filtering the portion of the fourth mixed liquor to form a filtrate and an activated sludge; and
    selectively recycling at least a portion of the activated sludge to at least one of the first anoxic zone, the aerobic zone, and the second anoxic zone.

15. The process of claim 14, wherein at least one of the first anoxic zone, the second anoxic zone, and the third anoxic zone promotes simultaneous nitrification and denitrification.

16. The process of claim 14, further comprising recycling a portion of mixed liquor from the second anoxic zone to the first anoxic zone for mixing therein with the wastewater and the recycled activated sludge.

17. The process of claim 14, wherein the dissolved oxygen content of the recycled activated sludge is in a range of from about 4 mg/L to about 8 mg/L.

18. The process of claim 14, wherein an oxygen deficit is maintained in the first anoxic zone.

19. The process of claim 18, wherein solids are maintained in suspension in the first anoxic zone without aeration.

20. The process of claim 19, further comprising operating at least one of the second and the third anoxic zone as an aerated anoxic reactor.

21. A process for treating BOD, nitrogen and phosphorus containing wastewater, the process comprising:
    providing wastewater into an aerobic zone having activated sludge;
    mixing the wastewater with the activated sludge in the aerobic zone to form a first mixed liquor having a dissolved oxygen concentration of at least 1 mg/L;
    providing a first portion of the first mixed liquor into a first of a plurality of downstream treatment zones;
    mixing the first portion of the first mixed liquor with activated sludge in the first of the plurality of downstream treatment zones to form a second mixed liquor;
    transferring a portion of the second mixed liquor from the first of the plurality of downstream treatment zones to a membrane bioreactor;
    filtering the portion of the second mixed liquor to form a filtrate and a sludge;
    providing oxygen to the membrane bioreactor;
    introducing oxygen provided to the membrane bioreactor into the sludge to form an activated sludge with a dissolved oxygen level of between about 4 mg/L and about 8 mg/L;
    recycling a second portion of the first mixed liquor to a first of a plurality of upstream treatment zones;
    recycling a portion of the activated sludge to the first of the plurality of upstream treatment zones;
    mixing the second portion of the first mixed liquor, the portion of the activated sludge, and wastewater in the first of the plurality of upstream treatment zones to form a third mixed liquor; and
    transferring a portion of the third mixed liquor to a second of the plurality of upstream treatment zones.

22. The process of claim 21, further comprising providing a source of carbon to the first of the plurality of downstream treatment zones.

23. The process of claim 21, wherein mixing the wastewater with the activated sludge comprises mixing the wastewater with the activated sludge using a combination of aerator devices and mechanical mixers.

* * * * *